United States Patent
Cramer et al.

(10) Patent No.: US 6,920,579 B1
(45) Date of Patent: Jul. 19, 2005

(54) OPERATOR INITIATED GRACEFUL TAKEOVER IN A NODE CLUSTER

(75) Inventors: Samuel M. Cramer, Sunnyvale, CA (US); Naveen Bali, Santa Clara, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 550 days.

(21) Appl. No.: 09/933,866

(22) Filed: Aug. 20, 2001

(51) Int. Cl.[7] .............................................. G06F 11/07
(52) U.S. Cl. .............................. 714/4; 714/6; 714/24
(58) Field of Search .............................. 714/4, 5, 6, 7, 714/24

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,163,131 A | 11/1992 | Row et al. | |
| 5,355,453 A | 10/1994 | Row et al. | |
| 5,485,579 A | 1/1996 | Hitz et al. | |
| 5,633,999 A | 5/1997 | Clowes et al. | |
| 5,717,934 A * | 2/1998 | Pitt et al. | 714/24 |
| 5,781,770 A | 7/1998 | Byers et al. | |
| 5,802,366 A | 9/1998 | Row et al. | |
| 5,812,748 A * | 9/1998 | Ohran et al. | 714/4 |
| 5,812,751 A * | 9/1998 | Ekrot et al. | 714/4 |
| 5,819,292 A | 10/1998 | Hitz et al. | |
| 5,931,918 A | 8/1999 | Row et al. | |
| 5,941,972 A | 8/1999 | Hoese et al. | |
| 5,951,695 A | 9/1999 | Kolovson | |
| 5,963,962 A | 10/1999 | Hitz et al. | |
| 5,987,621 A * | 11/1999 | Duso et al. | 714/4 |
| 6,065,037 A | 5/2000 | Hitz et al. | |
| 6,119,244 A | 9/2000 | Schoenthal et al. | |
| 6,289,356 B1 | 9/2001 | Hitz et al. | |
| 6,292,905 B1 | 9/2001 | Wallach et al. | |
| 6,317,844 B1 | 11/2001 | Kleiman | |
| 6,425,035 B2 | 7/2002 | Hoese et al. | |
| 6,560,617 B1 * | 5/2003 | Winger et al. | 714/4 |
| 6,625,749 B1 | 9/2003 | Quach | |
| 6,728,897 B1 | 4/2004 | Cramer et al. | |
| 6,775,702 B2 | 8/2004 | Oeda et al. | |

FOREIGN PATENT DOCUMENTS

WO    WO 200011553 A1 *    3/2000    ........... G06F/11/14

OTHER PUBLICATIONS

Anupam Bhide, Elmootazbellah N. Elnozahy, Stephen P. Morgan, "A Highly Available Network File Server," Proceedings of the Winter 1991 USENIX Conference, Jan. 21–25, 1991, pp. 199–205.

* cited by examiner

*Primary Examiner*—Robert Beausoliel
*Assistant Examiner*—Joseph D Manoskey
(74) *Attorney, Agent, or Firm*—Cesari and McKenna, LLP (57) ABSTRACT

The invention is a method for operating a file server system in a cluster mode that provides for relatively rapid and reliable takeover by one file server of another. This is done by a system operator requesting takeover of file services of a file server, letting the first file server complete existing file service requests from clients, refusing further file service requests addressed to the first file server, and the one file server taking over by transferring file service requests to the one file server. As part of this takeover the one file server takes on the identity of the first filer and activates network interfaces and network addresses that replicate the first server's network addresses.

34 Claims, 5 Drawing Sheets

OPERATOR INITIATED GRACEFUL TAKEOVER IN A NODE CLUSTER

RELATED APPLICATIONS

This invention is related to U.S. patent application Ser. No. 09/625,234, now issued U.S. Pat. No. 6,728,897 on Apr. 27, 2004, entitled NEGOTIATING TAKE-OVER IN HIGH AVAILABILITY CLUSTER by Samuel M. Cramer, et al, filed Jul. 25, 2000, which is hereby expressly incorporated herein by reference.

FIELD OF THE INVENTION

The present invention relates to networks and more particularly to takeovers by one server of another server in a cluster of servers on a network.

BACKGROUND OF THE INVENTION

A storage system, such as a file server, is a special-purpose computer that provides file services relating to the organization of information on storage devices, such as hard disks. A file server ("filer") includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored. An example of a file system that is configured to operate on a filer is the Write Anywhere File Layout (WAFL™) file system available from Network Appliance, Inc., Sunnyvale, Calif.

As used herein, the term "storage operating system" generally refers to the computer-executable code operable on a storage system that implements file system semantics and manages data access. In this sense the Data ONTAP™ storage operating system with its WAFL file system, available from Network Appliance, Inc., is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

A filer cluster is organized to include two or more filers and two or more storage "volumes" that comprise a cluster of physical storage disks, defining an overall logical arrangement of storage space. Currently available filer implementations can serve a large number of volumes. Each volume is generally associated with its own file system. The disks within a volume/file system are typically organized as one or more groups of Redundant Array of Independent (or Inexpensive) Disks (RAID). RAID 4 implementations enhance the reliability/integrity of data storage through the redundant writing of data "stripes" across a given number of physical disks in the RAID group, and the appropriate caching of parity information with respect to the striped data. In the example of a WAFL-based file system, a RAID 4 implementation is advantageously employed and is preferred. This implementation specifically entails the striping of data bits across a group of disks, and separate parity caching within a selected disk of the RAID group.

It is advantageous for the services and data provided by a storage system to be available for access to the greatest degree possible. Accordingly, some computer storage systems provide a plurality of filers in a cluster, with the property that a second filer may takeover for a first filer and provide the services and the data otherwise provided by the first filer. The second filer provides these services and data by a "takeover" of resources otherwise managed by the first filer.

When two filers in a cluster provide backup for each other it is important that the filers be able to reliably handle any required takeover operations. It would be advantageous for this to occur without either of the two filers interfering with proper operation of the other filer. To implement these operations each filer has a number of modules that monitor different aspects of its operations of a filer. A failover monitor is also used to gather information from the individual modules and determine the operational health of the portion of the filer that is being monitored by each module. All the gathered information is preferably stored in a non-volatile random access memory (NVRAM) of both the filer in which the monitor and modules are located, and in the NVRAM of the partner filer. The gathered information is "mirrored" on the partner's NVRAM by sending the information over a dedicated, high-speed, communication channel or "cluster interconnect" (e.g. Fibre Channel) between the filers.

Upon takeover of a first filer, the partner filer asserts disk reservations to take over responsibility of the disks of the first filer, and then sends a series of "please die" commands to the first filer. After a takeover by a partner filer from a first filer, the partner handles both file service requests that have normally been routed to it from clients plus file service requests that had previously been handled by the first filer and that are now routed to the partner. Subsequently, the first filer is rebooted and restored to service.

With the takeover described above, the first filer does not shut down "cleanly" and all services of the first filer are not terminated in an orderly fashion. This includes terminating client connections to the first filer without completing existing service requests thereto. In addition, there is usually some data remaining in the persistent memory, which may be NVRAM, of the first filer that is "not flushed" and stored to hard disk, and the partner has to re-execute access requests of the shutdown filer. This can adversely affect system performance.

SUMMARY OF THE INVENTION

The present invention provides a storage system having a plurality of filers connected in a cluster configuration, and a method for operating the system that provides a system operator initiated takeover of a filer in an orderly, graceful fashion.

A first filer, operating within a cluster, may operate in a takeover mode when initiated by a system operator to take over the file services provided by a second filer in the cluster. A cluster interconnect link provides communication between the filers to transfer state information, including file service logs and other information, and to issue and receive commands between the filers.

A system operator may cause a filer to take over the file server operations of another filer for any reason, such as for routine maintenance, software or hardware upgrades, and system re-configuration. The operator can initiate takeover by a command issued to either the filer to be shutdown or to the filer that is to take over that filer's services. If the operator is at a first filer that is to be taken over he/she may cause the first filer to issue a "please takeover" command to a partner filer which will cause the partner filer to first determine if it is able to take over the operations of the first filer and, if it can, to issue a "please shutdown" command back to the first filer over the cluster interconnect. Responsive to the "please shutdown" command the first filer does not immediately shutdown, but rather "gracefully" shuts down to avoid causing problems with clients accessing the first filer.

As part of this graceful shutdown, the first filer performs the following operations: existing file service requests being processed are completed, non-processed file service requests are stored in the persistent memory of the first filer and the persistent memory of its partner, and the first filer ceases accepting new requests for file services. In addition, the first filer can notify clients that the filer connection is terminating to give the clients time to disconnect in an orderly manner.

In response to the "please shutdown" command issued by the partner filer, a countdown timer is started in the partner. Thereafter, the partner determines if the first filer has shut down. If the first filer has completed serving file service requests that were being processed when the "please shutdown" command was received, and has shut down, the partner asserts "disk reservations" to take over responsibility of the disks of the first filer. In the event that the first filer has not shut down by the end of the countdown period, the partner sends a "takeover" command to the first filer, thereby forcing it to shut down. The partner then asserts "disk reservations" to take over responsibility of the disks of the first filer.

Alternatively, an operator can initiate takeover by a command to the partner filer that the operator wishes the partner to take over the file services of the first filer. In response the partner filer will first determine if it is able to take over the operations of the first filer and, if it can, it will issue a "please shutdown" command to the first filer over the cluster interconnect. Responsive to the "please shutdown" command the first filer does not immediately shutdown, but rather "gracefully" shuts down. The partner filer can utilize the countdown timer, assert disk reservations, and send a "takeover" command, as appropriate, all as described above.

With the first filer being out of service, file service requests from clients are rerouted to the partner. The partner uses the information of the first filer stored in its NVRAM to take over the file services of the first filer. In addition, in some implementations the partner periodically sends "please die" commands to the first filer so that it does not try to reboot itself without a graceful return of service from the partner.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The teaching of this invention can be adapted to a variety of storage system architectures including, but not limited to, a network-attached storage environment, a storage area network and disk assemblies directly-attached to a client/host computer. The term "storage system" should therefore be taken broadly to include such arrangements. It is expressly contemplated that the various processes, architectures and procedures described herein can be implemented in hardware, firmware or software, consisting of a computer-readable medium including program instructions that perform a series of steps. However, it should be understood that the teaching of this invention can be applied to any server systems.

Figure 1:
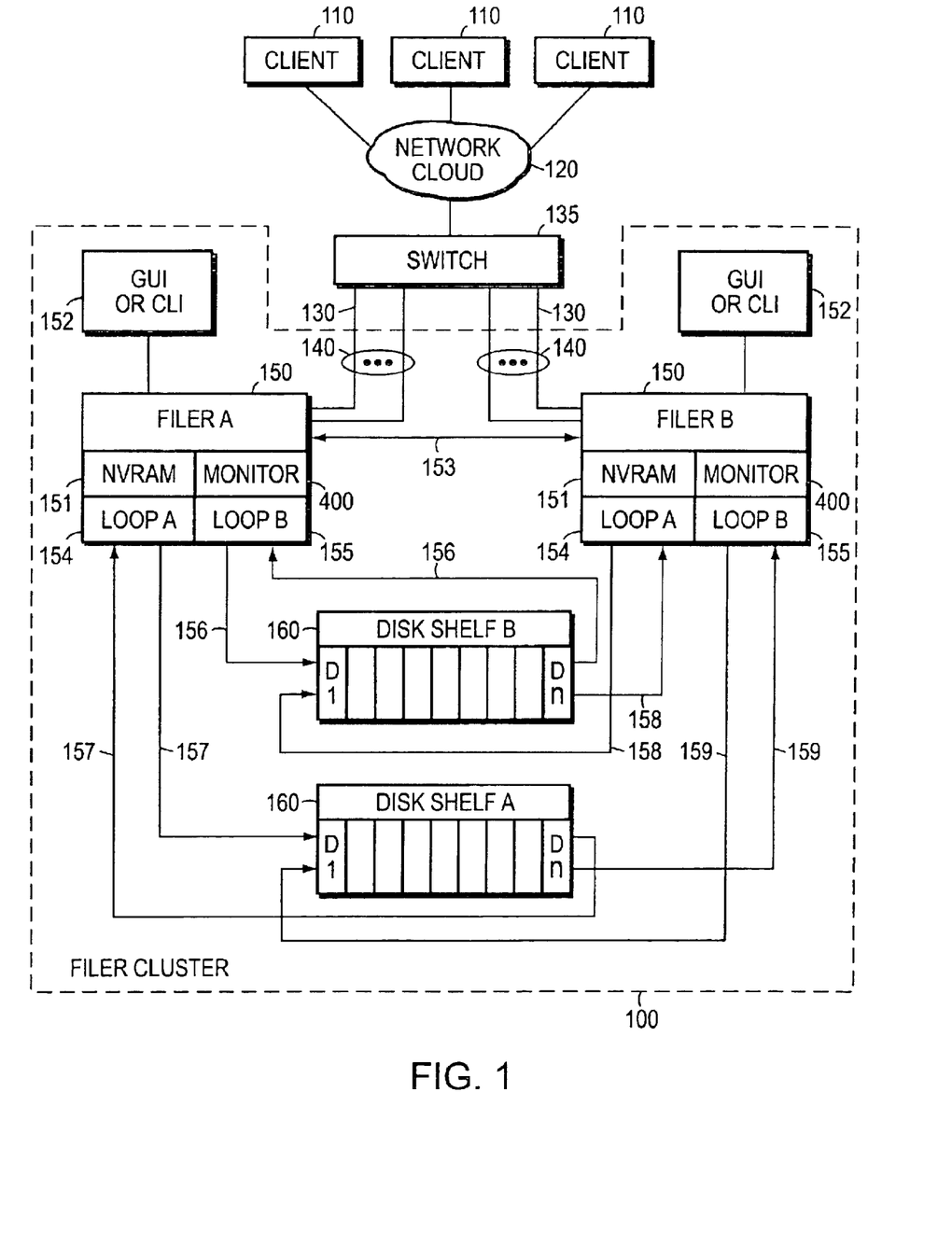
FIG. 1 is a block diagram of two filers connected in a cluster configuration so one filer takes over for the other filer.

FIG. 1 is a block diagram of two filers designated filer A 150 and filer B 150 connected as two nodes in a filer cluster 100 as shown. In accordance with the teaching of the invention, filer A and filer B provide takeover protection to each other when one fails. It should be understood that while only two filers and two disk shelves are shown in the cluster configuration shown in FIG. 1, this has been done solely for the sake of brevity and multiple filers and disk shelves may be connected in a cluster configuration and provide takeover for each other. Further, there may be more than one RAID group and multiple volumes within multiple RAID groups associated with each filer. In this description the terms filer, file server and storage system are used synonymously. In FIG. 1 filers A & B are preferably file servers configured to provide file services relating to the organization of information on storage devices, such as hard disks D1–Dn in disk shelves A & B 160.

A client 110 may be a general-purpose computer, such as a PC, configured to execute applications and operating systems that include file system protocols. Moreover, each client 110 will interact with a filer 150 in accordance with a client/server model of information delivery. That is, a client 110 will request the services of a filer 150 to retrieve files. Clients 110 access filers 150 in cluster 100 via network cloud 120, switch 135 and physical communication links 130 that may be arranged in aggregates or bundles 140. In the following paragraphs the description is often singularly referenced to filer A or B, but it should be kept in mind that the description also applies to the other filer.

Clients typically communicate with filers over a network using a known file system protocol consistent with the operating system running on the clients. The Network File System (NFS) is a file system protocol for accessing filers in a UNIX environment. The Common Internet File System (CIFS) is an open standard, connection oriented protocol providing remote file access over a network and is used with filers to provide service to PCs in a Windows environment. Accordingly, CIFS is widely used with servers, such as filers, that have PC clients accessing them.

As part of a cluster operation, filers A & B have primarily assigned to each of them a disk shelf 160 comprised of hard disk storage devices D1–Dn that operate in a manner well known in the art. The filers may be controlled by any operating system and filer software, which may preferably be the Data ONTAP™ storage operating system available from Network Appliance, Inc. that is optimized for filer services. This operating system implements a Write Anywhere File Layout (WAFL) on the disk shelves. To understand the takeover operation described further in this specification, it is important to understand that filers A & B access both disk shelves A and B. Filer A accesses its disk shelf A via loop A 154, through a transmission medium 157, and accesses disk shelf B via loop B 155, through a transmission medium 156. Similarly, filer B has primarily assigned to it a disk shelf B that it accesses via its loop A 154, through a transmission medium 158, and accesses disk shelf A via its loop B 155, through a transmission medium 159. This joint access is necessary for a partner filer to access a first filer's disk shelf to continue providing file services to the clients of the first filer after a takeover.

To implement an operator initiated takeover of a filer, there is a communication link between filers A & B that operates in a peer-to-peer capacity across one or more dedicated communication links, such as cluster interconnect 153. The cluster interconnect can utilize any communication medium and protocol including a Fibre Channel and a Server Net Fail-over link, both of which are commonly known in the industry. Fibre Channel is the general name of an integrated set of standards used for apparatus to quickly transfer data between all types of hardware in the computer industry. Filers A and B each have a conventional Graphical User Interface (GUI) or Command Line Interface (CLI) 152 that provide a manual interface to the filer cluster 100 for a system operator.

Each filer has a failover monitor 400 that continuously checks and records the status of hardware and software associated with the filer. This information is kept in NVRAM 151 in each filer.

A partner filer that has taken over for a first filer takes over the hard disks and executes access requests to the first filer using the first filer's information stored in the NVRAM of the partner filer. The NVRAM of each of the filers contains copies of the state information of both filers. As part of this takeover the partner takes on two identities: its own identity and the identity of the first filer. In addition, the partner also activates network interfaces and network addresses that replicate the first filer's network addresses. The identity and replicated network interfaces and network addresses are used until the first filer is rebooted and control is returned to it.

Figure 2:
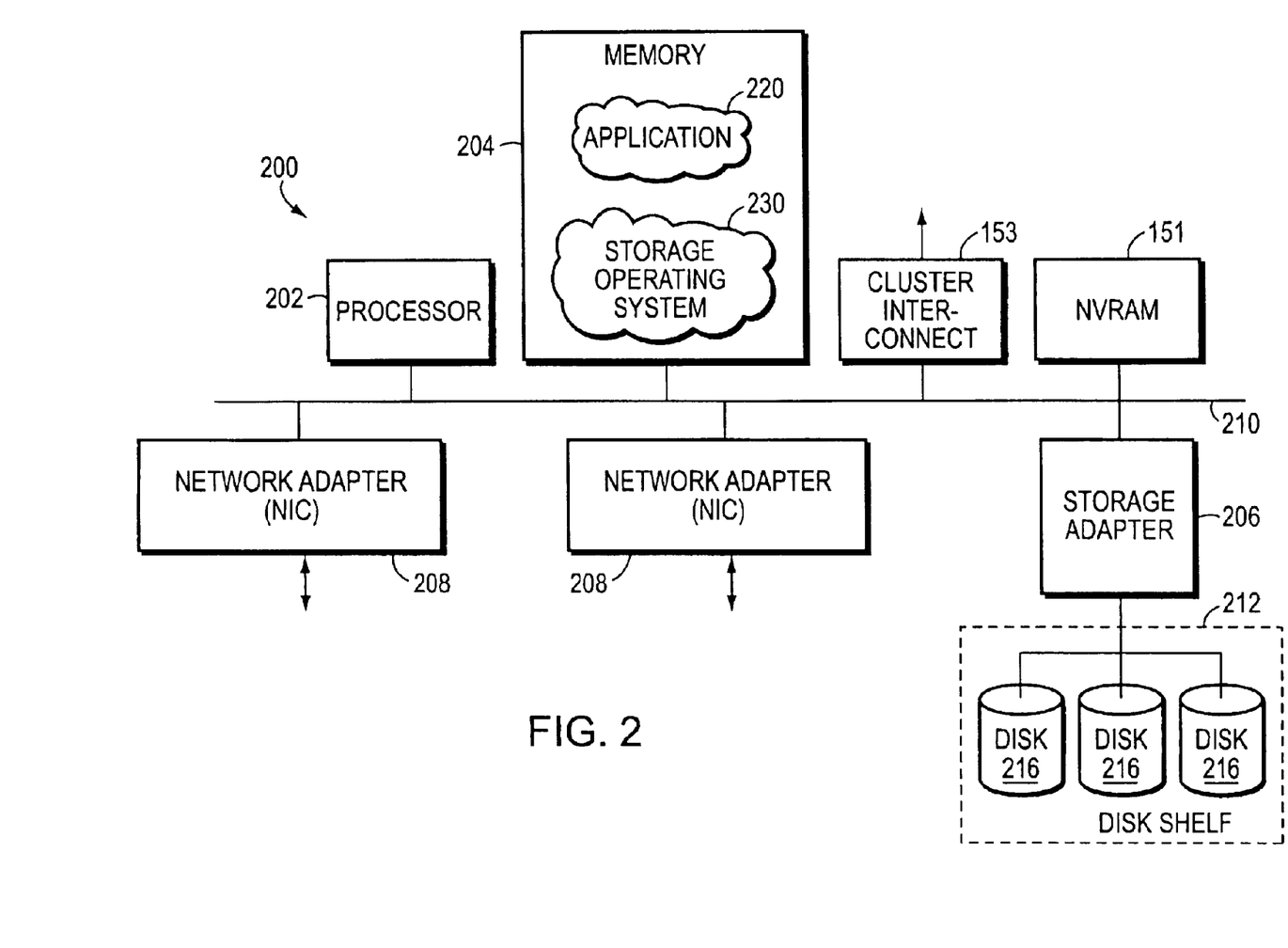
FIG. 2 is a block diagram of a filer that may be used with the present invention.

FIG. 2 is a block diagram of filer 200 comprising a processor 202, cluster interconnect 153, NVRAM 151, a memory 204 that may store an application 220, a storage adapter 206 and at least one network adapter 208 all interconnected by a system bus 210, which is preferably a conventional peripheral computer interconnect (PCI) bus. Storage adapter 206 is connected to disks 216 via a Fibre Channel link. The filer also includes storage operating system 230 stored in memory 204 that implements a file system to logically organize information stored as a hierarchical structure of directories and files on the disks in an assigned disk shelf 212. Disks in the disk shelf are typically organized as a RAID 4 (Redundant Arrays of Inexpensive Disks) array to protect against data loss caused by disk failure in a manner well known in the art. RAID arrays also improve data availability because a filer can continue operation even with a single failed disk.

Storage adapter 206 cooperates with storage operating system 230 executing on processor 202 to access stored information requested by a client 110, which information is stored on hard disks 216. Storage adapter 206 includes input/output (I/O) interface circuitry that couples to the disks 216 over an I/O interconnect arrangement, such as a conventional high-performance, Fibre Channel serial link topology (not shown). Storage adapter 206 retrieves the stored information and it is processed, if necessary, by processor 202 (or storage adapter 206 itself) prior to being forwarded over system bus 210 to a network adapter 208, where the information is formatted into packets and returned via a network (not shown) to a client 110 (not shown in FIG. 2) that requested the information.

Each network adapter in FIG. 2 may comprise a network interface card (NIC) having the necessary mechanical, electrical and signaling circuitry needed to connect a filer to a network node switch (not shown) via the physical communication links 130 shown in FIG. 1.

Figure 3:
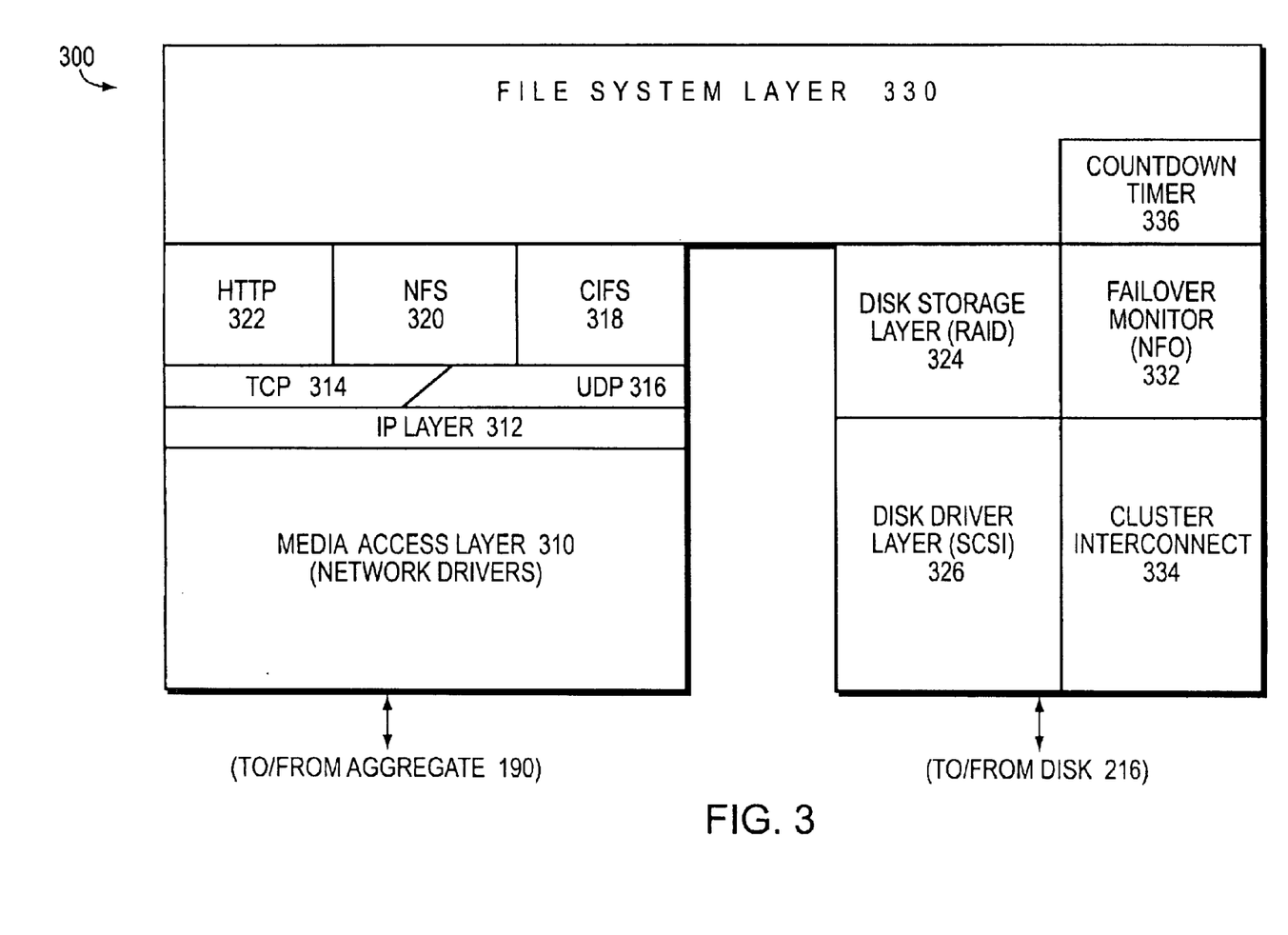
FIG. 3 is a block diagram of a storage operating system that may advantageously be used with the filers of the present invention.

FIG. 3 is a block diagram of the Data ONTAP storage operating system 300 available from Network Appliance, Inc. that is preferably used in implementing the invention. Storage operating system 300 implements the specialized file server operations of the Data ONTAP storage operating system on each filer. The operating system comprises a series of software layers, including a media access layer 310 of network drivers (e.g., an Ethernet NIC driver) that function with network adapters 208 in FIG. 2. Operating system 300 further includes network protocol layers, such as the IP layer 312 and its supporting transport mechanisms, the Transport Control Protocol (TCP) layer 314, and the User Datagram Protocol (UDP) layer 316. A file system protocol layer includes support for the Common Interface File System (CIFS) protocol 318, the Network File System (NFS) protocol 320 and the Hypertext Transfer Protocol (HTTP) protocol 322. In addition, the storage operating system includes a disk storage layer 324 that implements a disk storage protocol, such as the Redundant Array of Independent Disks (RAID 4) protocol 324, and a disk driver layer 326 that implements a disk access protocol.

Storage operating system 300 has additional software layers, such as cluster interconnect layer 334 for controlling the operation of the cluster interconnect link between filers A & B in FIG. 1. A failover monitor layer 332 controls collection and analysis of information regarding the operation of the filer and hardware connected thereto. The failover monitor layer also controls storing such information in the NVRAM, storing a mirror image copy of the information in a mass storage device or the NVRAM, and controlling other communications between filers A & B.

Bridging the network system and file system protocol layers in the storage operating system is a file system layer 330 that controls storage and retrieval of data in the RAID 4 array of disks in each disk shelf. This includes a countdown timer 336 that is used to time a period in which a first filer must gracefully shutdown before its partner forcefully takes over its file service operations.

In an alternate embodiment of the invention, some functions performed by the operating system may be implemented as logic circuitry embodied within a field programmable gate array (FPGA) or an application specific integrated circuit (ASIC). This type of hardware implementation increases the performance of the file service provided by a filer in response to a file system request issued by a client 110. Moreover, in another alternate embodiment of the invention, the processing elements of network and storage adapters may be configured to offload some or all of the packet processing and storage access operations, respectively, from the processor to thereby increase the performance of the file service provided by the filer.

The following is a description of a takeover of a first filer by its partner, as initiated by a system operator while located at the first filer, for maintenance, software updates, or any other reason. If the system operator decides to cause the partner filer to take over the file server operations of the first filer, the operator can do one of a few things. The operator can issue a "halt" command that causes a "heartbeat" signal to cease being sent from the first filer to the partner filer. Responsive thereto the partner filer immediately asserts disk reservations and takes over the hard disk of the first filer. This is a hard takeover, not a graceful one, and is not the preferred method for taking over the operations of the first filer. Preferably, instead, the operator will issue a "please takeover" command to the partner filer. Responsive to the "please takeover" command the partner filer issues a "please shutdown" command to the first filer over the dedicated interconnect.

To provide time for a graceful shutdown, a countdown timer is started in the partner filer when it issues the "please shutdown" command to the first filer. While that counter is counting down, the first filer completes file service requests that were being processed when the "please shutdown" was received, and stores state information and file service requests that had not been processed. If the first filer has shut down the partner will detecting the absence of the periodic "heartbeat" signals and asserts "disk reservations" to take over the responsibility of the disks of the first filer. The graceful takeover of the first filer is completed.

If the first filer has not completed shutting down, as described in the previous paragraph, by the end of the countdown period, the partner filer issues a "takeover" command to the first filer forcing it to shut down. The partner filer also asserts "disk reservations" to take over responsibility of the disks of the first filer and takes over the filer services of the first filer.

With the first filer out of service, file service requests from clients are rerouted to and handled by the partner in the same manner as file service requests normally routed to it. As part of this takeover the partner takes on two identities: its own identity and the identity of the first filer. In addition, the partner also activates network interfaces and network addresses that replicate the first filer's network addresses. The identity and replicated network interfaces and network addresses are used by the partner until the first filer is rebooted and control is returned to it.

Alternatively, if a system operator is located at the partner filer and wishes the partner filer to take over the operations of the first filer for maintenance, software updates, or any other reason, he/she issues a "please shutdown" command to the first filer. In addition, the countdown timer is started at the partner filer. As previously described, the first filer shuts down gracefully by storing its state information, un-processed service requests, and completing service requests that were being processed when the "please shutdown" was received. Upon a graceful shutdown by the first filer it stops issuing "heartbeat" signals and the partner filer asserts "disk reservations" to take over responsibility of the disks of the first filer and takes over the filer services of the first filer.

If the first filer has not completed shutting down, as previously described, by the end of the countdown period, the partner filer issues a "takeover" command to the first filer forcing it to shut down. The partner filer also asserts "disk reservations" to take over responsibility of the disks of the first filer and takes over the filer services of the first filer in the manner described above.

When the first filer is rebooted the system operator sends a "giveback command" to the partner filer. After reboot, control is returned to the first filer and file service requests are rerouted to and serviced by the first filer.

Figure 4:
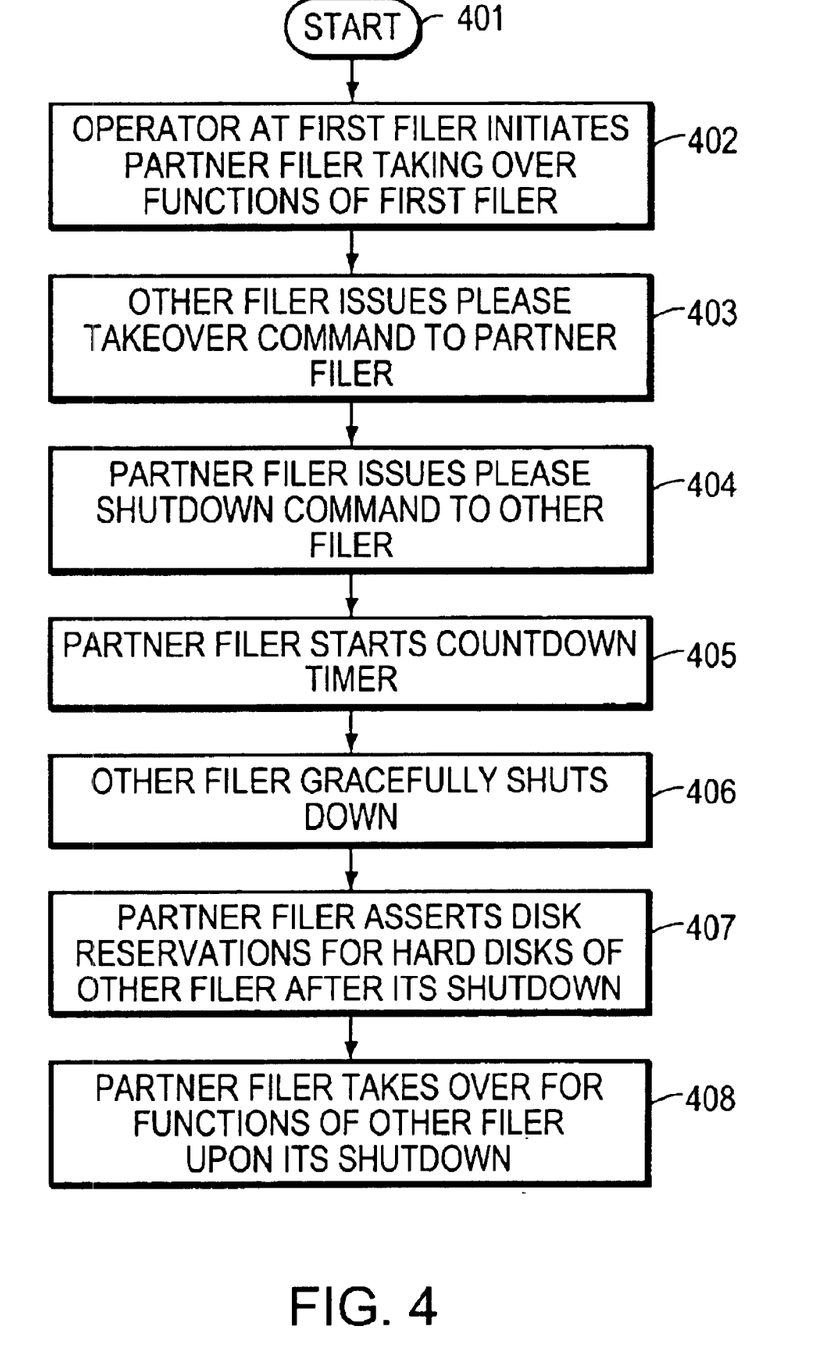
FIG. 4 is a flowchart illustrating the sequence of steps comprising a takeover of a filer in a cluster of filers initiated by a system operator at the filer to be shut down.

FIG. 4 is a flowchart illustrating the sequence of steps followed in performing a system operator initiated takeover from the filer to be taken over ("other filer").

The sequence starts at blocks 401. At block 402 the system operator is at the other filer and initiates its operation at block 403 to issue a "please takeover" command over the cluster interconnect to the partner filer.

At block 404 the partner filer issues a "please shutdown" command to the other filer. At the same time the partner filer starts a countdown timer at block 405.

At block 406 the other filer is performing a "graceful" shutdown during which it stores its state information, un-processed service requests, and completes service requests that were being processed when the "please shutdown" was received. Upon a graceful shutdown by the other filer it stops issuing "heartbeat" signals. At block 407 the partner filer asserts "disk reservations" to take over responsibility of the disks of the other filer. Finally, at block 408 the partner filer takes over the filer services of the other filer.

Figure 5:
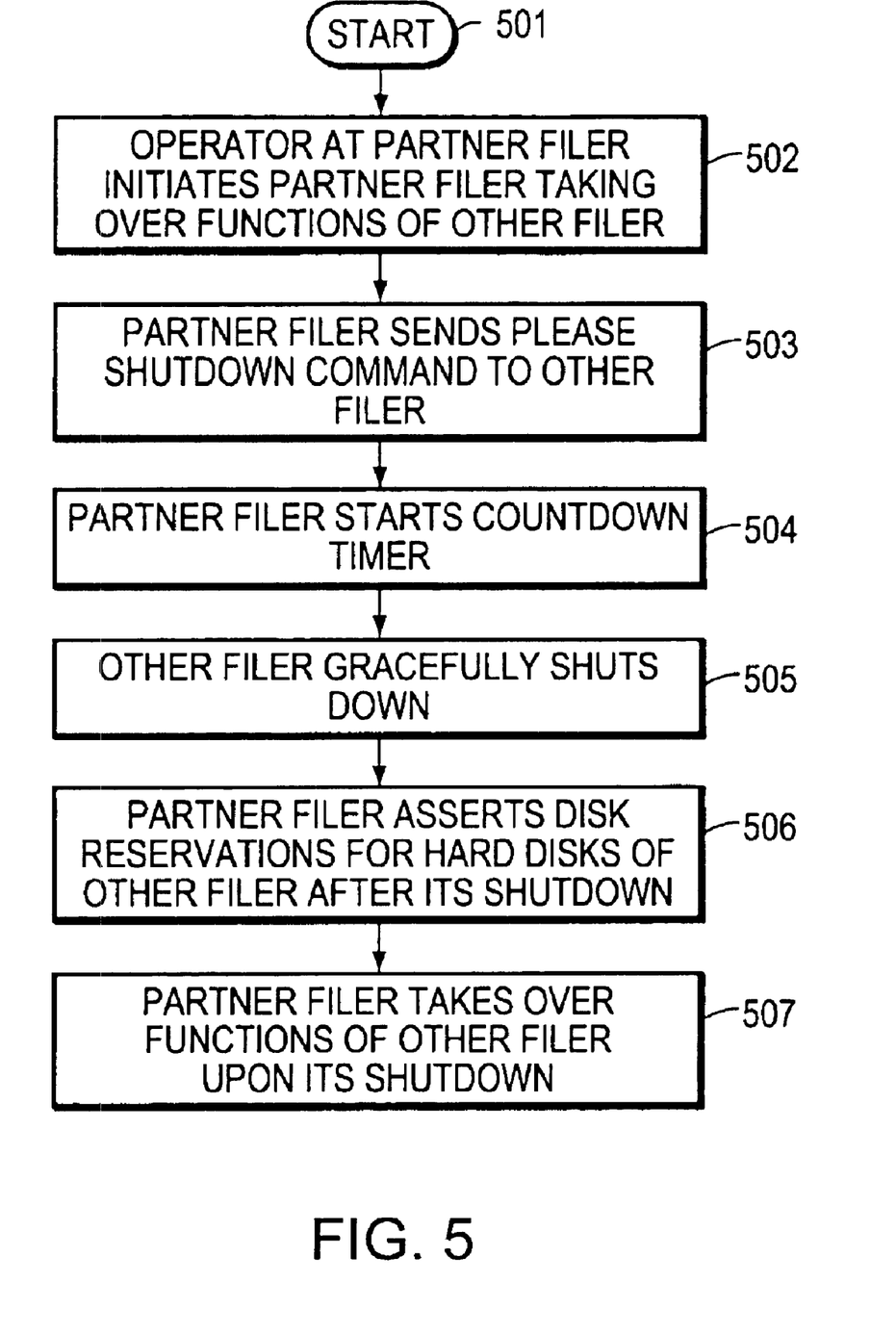
FIG. 5 is a flowchart illustrating the sequence of steps comprising a takeover of a filer in a cluster of filers initiated by a system operator at the filer that will take over for the filer being shut down.

FIG. 5 is a flowchart illustrating the sequence of steps comprising a takeover of a filer in a cluster of filers initiated from the partner filer that will take over for the filer being shut down.

The sequence starts at blocks 501. At block 502 the system operator is at the partner filer and initiates its operation at block 503 to issue a "please shutdown" command over the cluster interconnect to the other filer.

At block 504 the partner filer starts a countdown timer. The other filer is performing a graceful shutdown at block 505, during which it stores its state information, un-processed service requests, and completes service requests that were being processed when the "please shutdown" was received.

Upon a graceful shutdown by the first filer it stops issuing "heartbeat" signals. At block 506 the partner filer asserts "disk reservations" to take over responsibility of the disks of the other filer. Finally, at block 507 the partner filer takes over the filer services of the other filer.

Although the preferred embodiment of the apparatus and method of the present invention has been illustrated in the accompanying drawings and described in the foregoing Detailed Description, it is understood that the invention is not limited to the embodiments disclosed, but is capable of numerous rearrangements, modifications and substitutions without departing from the spirit of the invention as set forth and defined by the following claims. For example, a system operator may be located at a management console and may access either filer to perform the above steps.

What is claimed is:

1. A method for use in an operator initiated graceful takeover in a computer cluster having a first and second computer, the method comprising the steps of:

receiving, at the second computer, an indication that the operator has requested that the second computer take over for the first computer;

requesting, from the second computer, that the first computer shut down;

completing service requests at the first computer pending at the time the first computer was requested to shut down;

transferring responsibilities of the first computer to the second computer; and shutting down the first computer.

2. The method as in claim 1, further comprising:
generating the indication as an operator request from within the first computer; and
sending the indication from the first computer to the second computer.

3. The method as in claim 1, further comprising: generating the indication as an operator request from within the second computer.

4. The method as in claim 1, further comprising: refusing further service requests at the first computer after the first computer was requested to shut down.

5. The method as in claim 4, further comprising: transferring access of a storage device for the first computer to the second computer.

6. The method as in claim 1, further comprising: asserting, at the second computer, disk reservations of disks of the first computer.

7. The method as in claim 1, further comprising: rerouting file service requests from the first computer to the second computer.

8. The method as in claim 1, further comprising: activating, at the second computer, network interfaces and network addresses that replicate those of the first computer.

9. The method as in claim 1, further comprising: initiating a countdown timer subsequent to the shut down request from the second computer.

10. The method as in claim 9, further comprising: forcing the first computer to shut down in the event the first computer is still operating at the expiration of the countdown timer.

11. The method as in claim 1, further comprising: detecting, at the second computer, the shut down of the first computer by the absence of a periodic heartbeat signal.

12. The method as in claim 1, further comprising: storing, at the first computer, state information of the first computer prior to shutting down.

13. The method as in claim 1, further comprising: sending periodic requests from the second computer to the first computer to remain shut down, after the first computer has shut down.

14. The method as in claim 1, further comprising: requesting, from the first computer, that the second computer restore responsibilities of the first computer to the first computer.

15. The method as in claim 1, further comprising: restoring responsibilities of the first computer to the first computer upon restart of the first computer.

16. The method as in claim 1, further comprising: using the first and second computers as a file servers.

17. A storage system capable of performing an operator initiated graceful takeover, the storage system comprising:
a first computer; and
a second computer having a processor to
  i) receive an indication that the operator has requested that the second computer take over for the first computer,
  ii) request that the first computer shut down,
  iii) allow the first computer to complete service requests pending at the time the first computer was requested to shut down,
  iv) take over any responsibilities of the first computer, and
  v) allow the first computer to shut down.

18. The storage system as in claim 17, further comprising: a processor for the first computer to i) generate the indication as an operator request, and ii) send the indication to the second computer.

19. The storage system as in claim 17, further comprising: the processor of the second computer to generate the indication as an operator request.

20. The storage system as in claim 17, further comprising: a processor for the first computer to refuse further service requests at the first computer after the first computer was requested to shut down.

21. The storage system as in claim 17, further comprising:
a storage device for the first computer; and
an interconnect to transfer access of the storage device for the first computer to the second computer.

22. The storage system as in claim 17, further comprising: disks of the first computer, the disks to be reserved by the second computer while the first computer is shut down.

23. The storage system as in claim 17, further comprising: an interconnect to reroute file service requests from the first computer to the second computer.

24. The storage system as in claim 17, further comprising:
network interfaces at the first computer;
network addresses at the first computer;
network interfaces at the second computer that replicate the network interfaces of the first computer; and
network addresses at the second computer that replicate the network interfaces of the first computer, the network interfaces and addresses at the second computer that replicate the network interfaces and addresses of the first computer to be activated by the second computer while the first computer is shut down.

25. The storage system as in claim 17, further comprising: a countdown timer, the countdown timer to be initiated subsequent to the shut down request from the second computer.

26. The storage system as in claim 25, further comprising: an interconnect to force the first computer to shut down in the event the first computer is still operating at the expiration of the countdown timer.

27. The storage system as in claim 17, further comprising: an interconnect at the second computer to detect the shut down of the first computer by the absence of a periodic heartbeat signal.

28. The storage system as in claim 17, further comprising: persistent memory at the first computer to store state information of the first computer prior to shutting down.

29. The storage system as in claim 17, further comprising: an interconnect at the second computer to send periodic requests to the first computer to remain shut down, after the first computer has shut down.

30. The storage system as in claim 17, further comprising: a processor for the first computer to request that the second computer restore responsibilities of the first computer to the first computer.

31. The storage system as in claim 17, further comprising: an interconnect to restore responsibilities of the first computer to the first computer upon restart of the first computer.

32. The storage system as in claim 17, further comprising: the first and second computers are file servers.

33. A storage system capable of performing an operator initiated graceful takeover, the storage system comprising:
a first computer;
a second computer;
means for receiving, at the second computer, an indication that the operator has requested that the second computer take over for the first computer;

means for requesting, from the second computer, that the first computer shut down;

means for completing service requests at the first computer pending at the time the first computer was requested to shut down;

means for transferring responsibilities of the first computer to the second computer; and means for shutting down the first computer.

34. A computer readable media, comprising: the computer readable media containing instructions for execution in a processor for the method of, receiving, at a second computer, an indication that an operator has requested that the second computer take over for a first computer;

requesting, from the second computer, that the first computer shut down;

completing service requests at the first computer pending at the time the first computer was requested to shut down;

transferring responsibilities of the first computer to the second computer; and shutting down the first computer.

* * * * *